(12) United States Patent
Diard

(10) Patent No.: US 8,149,247 B1
(45) Date of Patent: Apr. 3, 2012

(54) METHOD AND SYSTEM FOR BLENDING RENDERED IMAGES FROM MULTIPLE APPLICATIONS

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 903 days.

(21) Appl. No.: 11/936,037

(22) Filed: Nov. 6, 2007

(51) Int. Cl.
*G09G 5/00* (2006.01)

(52) U.S. Cl. ........ 345/629; 345/502; 345/503; 345/505; 345/639; 348/565

(58) Field of Classification Search .................. 345/505, 345/581, 629, 637, 639, 640, 1.1, 1.2, 1.3, 345/2.1, 3.1, 3.4, 501–503, 519–522, 589
See application file for complete search history.

(56) References Cited

U.S. PATENT DOCUMENTS

| | | | |
|---|---|---|---|
| 6,266,072 B1 * | 7/2001 | Koga et al. ................. | 345/505 |
| 7,075,541 B2 * | 7/2006 | Diard .......................... | 345/505 |
| 7,619,631 B1 * | 11/2009 | Diard et al. ................. | 345/505 |
| 2004/0075623 A1 * | 4/2004 | Hartman ..................... | 345/1.3 |
| 2005/0093890 A1 * | 5/2005 | Baudisch .................... | 345/639 |
| 2005/0253877 A1 * | 11/2005 | Thompson .................. | 345/698 |
| 2008/0055189 A1 * | 3/2008 | Wilk et al. .................. | 345/1.3 |
| 2008/0074403 A1 * | 3/2008 | Cho et al. ................... | 345/204 |
| 2008/0094410 A1 * | 4/2008 | Jiao et al. ................... | 345/592 |
| 2008/0316348 A1 * | 12/2008 | Hallock ...................... | 348/333.1 |
| 2009/0207178 A1 * | 8/2009 | Azar et al. .................. | 345/502 |

* cited by examiner

*Primary Examiner* — Daniel Washburn
*Assistant Examiner* — Donna Ricks
(74) *Attorney, Agent, or Firm* — Patterson & Sheridan, LLP.

(57) ABSTRACT

One embodiment of the present invention sets forth a method, which includes the steps of generating a first rendered image associated with a first application, independently generating a second rendered image associated with a second application, applying a first set of blending weights to the first rendered image to establish a first weighted image, applying a second set of blending weights to the second rendered image to establish a second weighted image, and blending the first weighted image and the second weighted image before scanning out a blended result to a first display device.

18 Claims, 6 Drawing Sheets

| Usage Model 1 | Usage Model 2 | Usage Model 3 |
|---|---|---|
| • Graphics subsystem with 2 GPUs attached to one display device | • Graphics subsystem with 2 GPUs, each of which is attached to one display device | • Graphics subsystem with 2 GPUs attached to one display device |
| • OS & app. recognizes one GPU & one display device | • OS & app. recognizes one GPU & one display device | • OS & app. recognizes one GPU & one display device |
| • 2 GPUs perform rendering operations associate with the same application and scan out to the display device | • 2 GPUs perform rendering operations associate with the same application; each GPU. scans out to its attached display device | • 2 GPUs renders the same frame associated with the same application; one of the GPUs pulls, blends, and scans out to the display device |

FIG. 1

METHOD AND SYSTEM FOR BLENDING RENDERED IMAGES FROM MULTIPLE APPLICATIONS

BACKGROUND OF THE INVENTION

1. Field of the Invention

Embodiments of the present invention relate generally to video processing and more specifically to a method and system for blending rendered images from multiple applications.

2. Description of the Related Art

Unless otherwise indicated herein, the approaches described in this section are not prior art to the claims in this application and are not admitted to be prior art by inclusion in this section.

To enhance a user's viewing experience of computer-generated images, more and more computing devices are relying on a dedicated graphics subsystem with not one but multiple graphics processing units ("GPUs") to perform rendering operations. The GPUs can be configured to perform operations such as split frame rendering ("SFR") or alternate frame rendering ("AFR") to scale up the number of pixels computed by the graphics subsystem. The GPUs can also be configured to efficiently perform anti-aliasing ("AA") operations to improve image quality. Some of the conventional usage models involving multiple GPUs are shown in FIG. 1.

To illustrate, suppose there are two GPUs, $GPU_0$ and $GPU_1$ in the graphics subsystem. Under the usage model 1, both the $GPU_0$ and $GPU_1$ are configured to carry out the rendering operations associated with the same application and scan out the rendered images to the only display device that is attached to the computing device and recognized by both the application and also the operating system executing on the computing device. The aforementioned SFR and AFR operations typically fall under this usage model 1. Under the usage model 2, each of $GPU_0$ and $GPU_1$ is attached to a distinct display device. Here, even though there are physically two GPUs and two display devices, the application and also the operating system executing on the computing device still only recognize one GPU and one display device. Each GPU is configured to compute one half of the surface that is being rendered and scan out the rendered images to its attached display device. The usage model 3 is similar to the usage model 1, except one of the GPUs is designated to pull, blend, and scan out the blended results associated with the same frame and also the same application to the display device. The AA operation discussed above generally falls under this usage model 3.

As the foregoing illustrates, none of the usage models shown in FIG. 1 and described above permits the multiple GPUs to perform operations for different applications and still scan out the rendered images to a single display device. Thus, especially for a user with access to a single display device but with needs to maneuver multiple graphics-intensive operations, what is needed is a way to blend rendered images from multiple applications.

SUMMARY OF THE INVENTION

A method and system for blending rendered images from multiple applications are disclosed. One embodiment of the present invention sets forth a method, which includes the steps of generating a first rendered image associated with a first application, independently generating a second rendered image associated with a second application, applying a first set of blending weights to the first rendered image to establish a first weighted image, applying a second set of blending weights to the second rendered image to establish a second weighted image, and blending the first weighted image and the second weighted image before scanning out a blended result to a first display device.

One advantage of the disclosed method and system is to enable high quality images from multiple applications to be displayed on a single display device cost effectively.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a table illustrating some conventional usage models involving multiple GPUs;

DETAILED DESCRIPTION

Figure 2A:
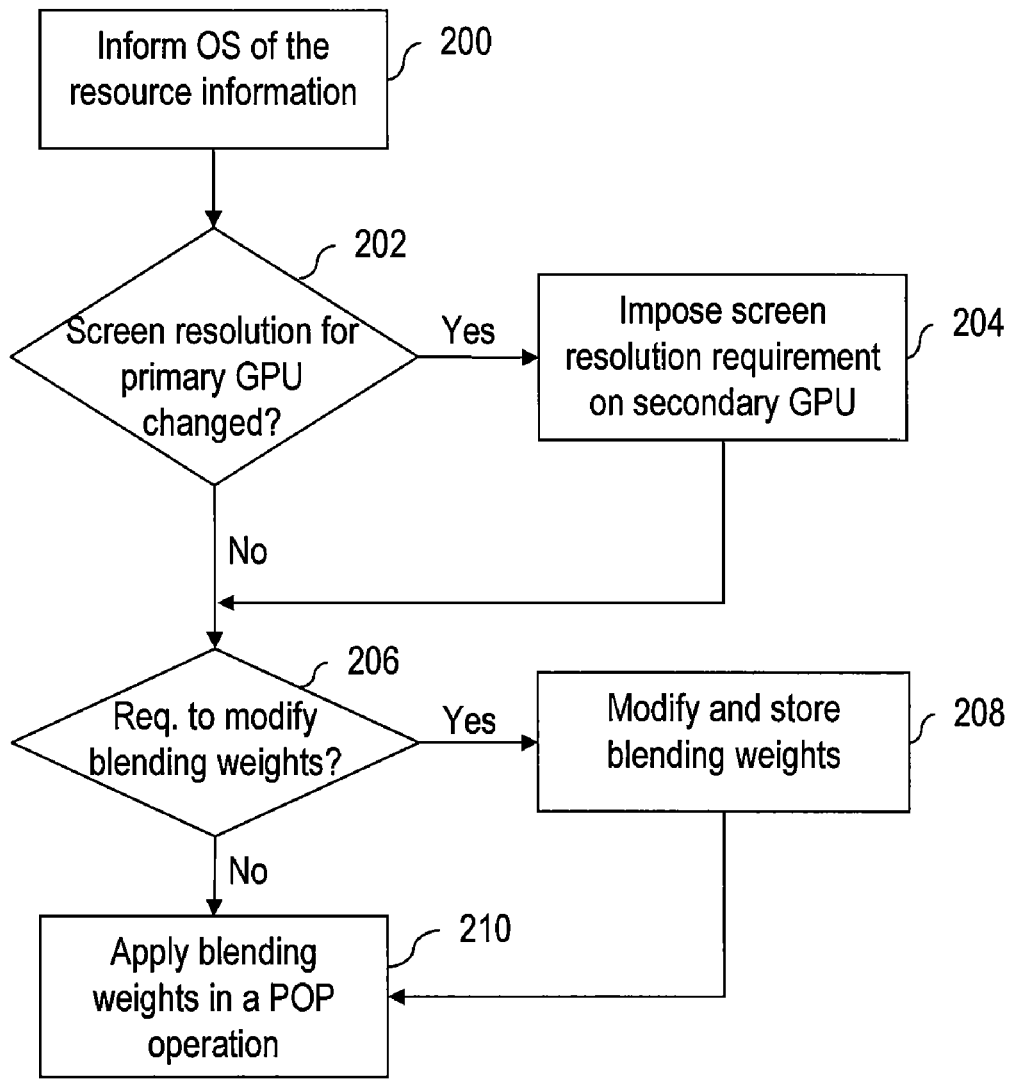
FIG. 2A is a flow chart illustrating the method steps of preparing for the blending of rendered images from multiple applications that are executing on a computing device in a picture on picture mode, according to one embodiment of the present invention.

FIG. 2A is a flow chart illustrating the method steps of preparing for the blending of rendered images from multiple applications that are executing on a computing device in a picture on picture mode, according to one embodiment of the present invention. Suppose this computing device is a laptop computer coupled to a docking station. The laptop computer includes a primary GPU, $GPU_0$, which resides in a first graphics adapter, and the docking station includes a secondary GPU, $GPU_1$, which resides in a second graphics adapter. The first graphics adapter is further attached to a first display device. Once the computing device is configured to operate in the picture-on-picture mode, although only one display device is attached to the graphics adapters, in step 200, the operating system executing on this computing device is informed that there are two GPUs, two graphics adapters, and two display devices attached to the graphics adapters. In one implementation, a driver associated with the graphics subsystem in the computing device intercepts the actual graphics resource information reported by the hardware components and provides the operating system with this specifically tailored graphics resource information. Even if the second graphics adapter is also attached to a second display device, one implementation of the driver still ensures that the $GPU_1$ transmits the rendered images to the $GPU_0$ to be scanned out to the first display device.

According to one aspect of the present invention, the two GPUs are configured to generate graphics images with the same screen resolution. Thus, if the screen resolution supported by the primary GPU, such as the $GPU_0$, is detected to have changed in step 202, then one implementation of the driver imposes the newly changed screen resolution requirement on the secondary GPU, such as the $GPU_1$, in step 204. On the other hand, if the screen resolution supported by the primary GPU remains unchanged, then whether there is a request to modify the blending weights is checked in step 206. Blending weights are primarily used to vary the visual effects of the images from different applications on the display device. Subsequent paragraphs will provide some examples illustrating the use of the blending weights. If the modification request is indeed detected in step 206, then the blending weights are modified and stored in step 208. In one implementation, the modified blending weights are stored in the registers of a video bridge. In addition, the various sets of blending weights can be associated with hotkeys. In particular, a hotkey can be a specific key or a combination of keys used in a specific sequence to represent a certain set of predetermined blending weights. In other words, by switching from one hot key to another, the blending weights can be modified dynamically. In step 210, the blending weights are applied to the rendered images generated by the GPUs, and these weighted images are blended.

Figure 2B:
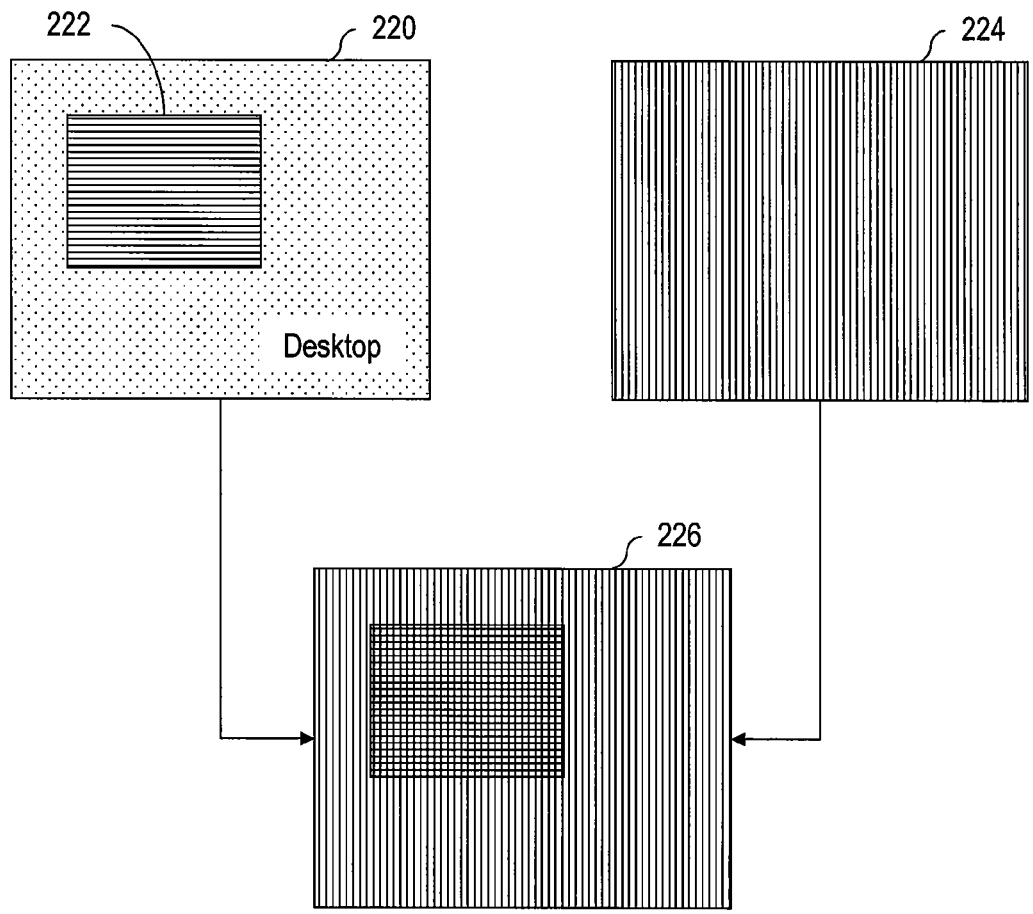
FIG. 2B illustrates an example of blending images from two different applications, according to one embodiment of the present invention.

In conjunction with FIG. 2A and the discussions above, FIG. 2B illustrates an example of blending images from two different applications, according to one embodiment of the present invention. Suppose a first screen 220 includes a display window 222 showing images from an application A (e.g., a video conference session) and also the desktop of the display window 222 (e.g., the desktop of an operating system) supported by the $GPU_0$, and a second screen 224 fully displays images from an application B (e.g., a game) supported by the $GPU_1$. Suppose no weight is assigned to the desktop of the display window 222; $weight_A$ is assigned to the images from the application A, and $weight_B$ is assigned to the images from the application B. After the blending step of 210, a resulting screen 226 is likely to show both the display window 222 with the images rendered by the $GPU_0$ and also the entire screen 224 with the images rendered by the $GPU_1$. Due to the zero weight, the initial desktop of the screen 220 does not contribute to the resulting screen 226. The same region on the screen 226 corresponding to the display window 222 in the screen 220, on the other hand, includes the blended results of [($weight_A$*images from application A)+($weight_B$*images from application B)]/divider. Thus, if the images from application A are meant to display more prominently in the foreground, then the $weight_A$ is configured to be greater than the $weight_B$. On the other hand, if the images from the application B should instead display more prominently in the foreground, then the $weight_B$ is configured to be greater than the $weight_A$. Any numerical value assigned to the divider is used to further modify the effects of the different weights.

Moreover, one way to modify these weights is through the use of hotkeys. In one implementation, a hotkey may be configured to showing the images from the application A only on the screen 226 (i.e., using this hot key results in setting the $weight_A$ to 1 and zeroing out all the other weights); another hotkey may be configured to showing the images from the application B only (i.e., using this hotkey results in setting the $weight_B$ to 1 and zeroing out all the other weights); and yet another hotkey may be configured to showing the images from both of the applications A and B (i.e., using this hotkey results in setting the $weight_A$ and $weight_B$ to non-zero values).

Figure 3:
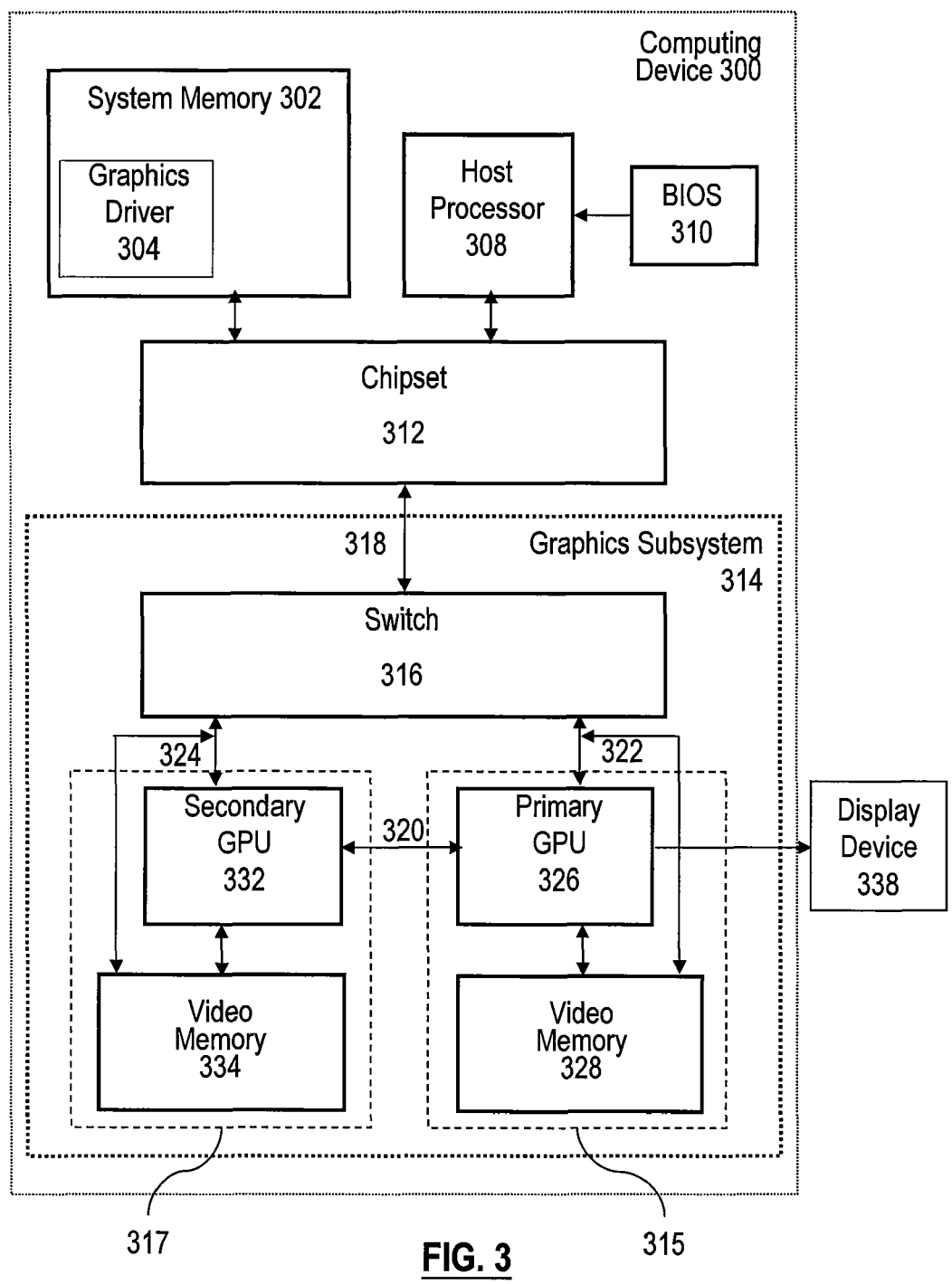
FIG. 3 is a block diagram of a computing device with a video bridge configured to implement one or more aspects of the present invention.

In one implementation, the blending of the weighted images from multiple applications is performed by a specialized hardware component, such as a video bridge blending logic. FIG. 3 is a block diagram of a computing device with the video bridge configured to implement one or more aspects of the present invention. Without limitation, the computing device 300 may be a desktop computer, server, laptop computer, palm-sized computer, tablet computer, game console, cellular telephone, hand-held device, mobile device, computer based simulator, or the like. The computing device 300 may also include a docking system. The computing device 300 includes a host processor 308, BIOS 310, system memory 302, and a chipset 312 that is directly coupled to a graphics subsystem 314. BIOS 310 is a program stored in read only memory ("ROM") or flash memory that is run at bootup. The graphics subsystem 314 includes a first and a second graphics adapters 315 and 317, each with a single GPU, namely primary GPU 326 and secondary GPU 332, respectively. If the computing device 300 is a laptop computer coupled to a docking system, then the primary GPU 326 resides in the laptop computer, and the secondary GPU 332 resides in the docking system.

A graphics driver 304, stored within the system memory 302, configures the primary GPU 326 and the secondary GPU 332 to independently communicate with the two distinct applications that are executed by the host processor 308. In one embodiment, the graphics driver 304 generates and places a stream of commands in a "push buffer," which is then transmitted to the GPUs. When the commands are executed, certain tasks, which are defined by the commands, are carried out by the GPUs.

In some embodiments of the computing device 300, the chipset 312 provides interfaces to the host processor 308, memory devices, storage devices, graphics devices, input/output ("I/O") devices, media playback devices, network devices, and the like. Some examples of the interfaces include, without limitation, Advanced Technology Attachment ("ATA") bus, Accelerated Graphics Port ("AGP"), Universal Serial Bus ("USB"), Peripheral Component Interface ("PCI"), and PCI-Express®. It should be apparent to a person skilled in the art to implement the chipset 312 in two or more discrete devices, each of which supporting a distinct set of interfaces.

Connections 318, 322, and 324 support symmetric communication links, such as, without limitation, PCI-Express®. A "symmetric" communication link here refers to any two-way link with substantially identical or identical downstream and upstream data transmission speed. A connection 320 can be any technically feasible scalable bus that provides a direct connection between the primary GPU 326 and the secondary GPU 332. One embodiment of the connection 320 can be implemented using the NVIDIA® SLI™ multi-GPU technology. The computing device 300 further includes a video bridge 316, which not only provides an interface between the chipset 312 and each of the primary GPU 326 and the secondary GPU 332 via the connection 322 and the connection 324, respectively, but the video bridge 316 also provides an interface between the primary GPU 326 and the secondary GPU 332 through the combination of the connections 322 and 324 and bypassing the chipset 312. Moreover, the video bridge 316 includes the blending logic to apply the appropriate weights to the rendered images and blend the weighted images.

As shown, the primary GPU 326 within the first graphics adapter 315 is responsible for outputting image data to a display device 338. The display device 338 may include one or more display devices, such as, without limitation, a cathode ray tube ("CRT"), liquid crystal display ("LCD"), plasma display device, or the like. The primary GPU 326 is also coupled to video memory 328, which may be used to store image data and program instructions. The secondary GPU 332 within the second graphics adapter 317 is also coupled to video memory 334, which may also be used to store image data and program instructions. The primary GPU 326 does not have to be functionally identical to the secondary GPU 332. In addition, the sizes of the video memories 328 and 334 and how they are utilized by the first and second graphics adapters 315 and 317, respectively, do not have to be identical.

To illustrate the aforementioned blending operation in the computing device 300, suppose the primary GPU 326 performs rendering operations for an application A, and the secondary GPU 332 performs rendering operations for an application B. When the secondary GPU 332 renders a frame, it pushes the rendered image associated with the application B from a secondary frame buffer in video memory 334 to the video bridge 316. Similarly, the primary GPU 326 also pushes the rendered image associated with the application A from a primary frame buffer in video memory 328 to the video bridge 316. The blending logic in the video bridge 316 then retrieves the blending weights stored in the registers of the video bridge 316, applies the appropriate blending weights to both of these rendered images, and blends the weighted images. In one implementation, the blended results are stored in the video memory 328 for the primary GPU 326 to scan out to the display device 338. It should be noted that the graphics subsystem 314 in this implementation neither depends on the resources of the chipset 312 nor the GPUs to carry out the blending operation.

Figure 4A:
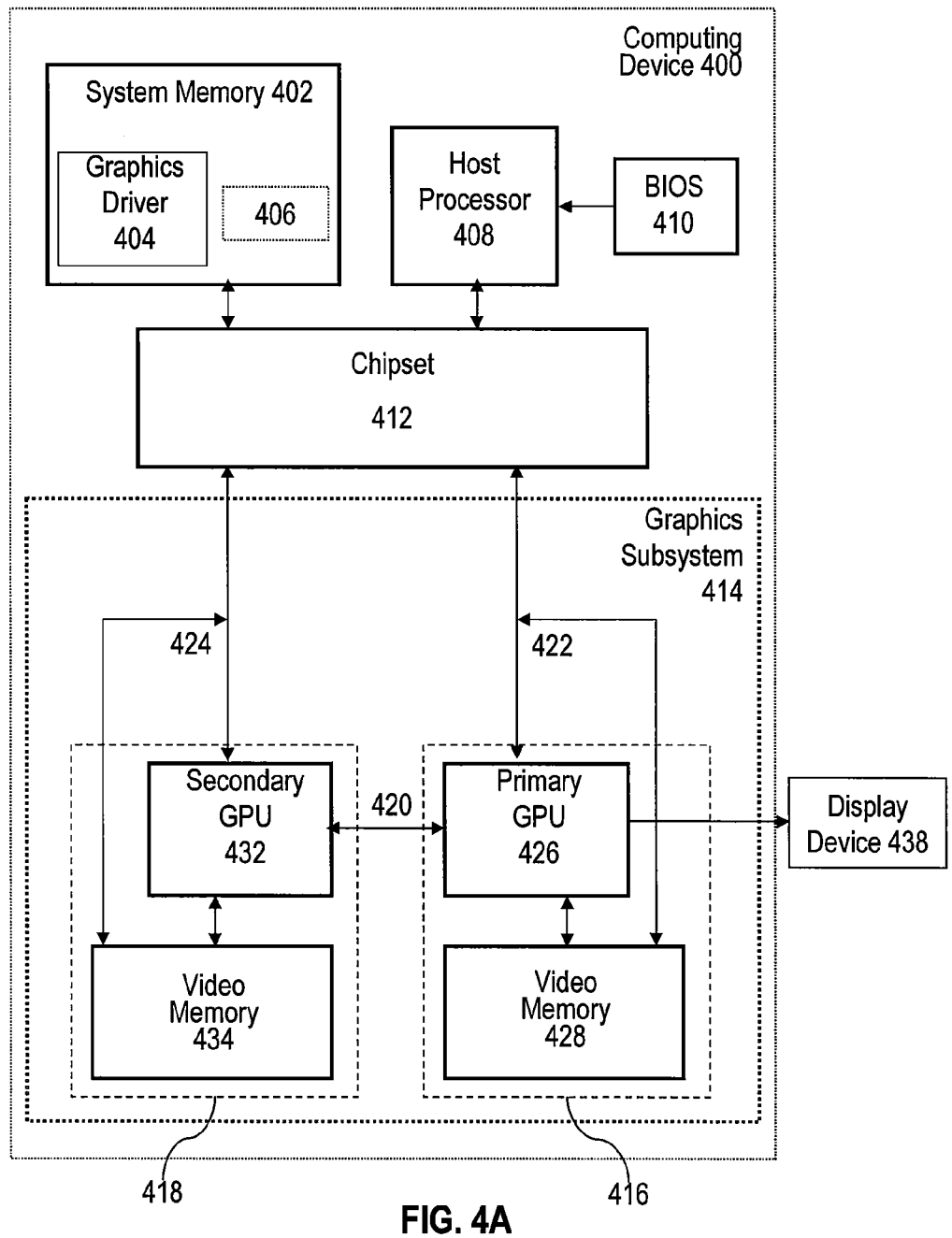
FIG. 4A is a block diagram of another computing device also configured to implement one or more aspects of the present invention.
Figure 4B:
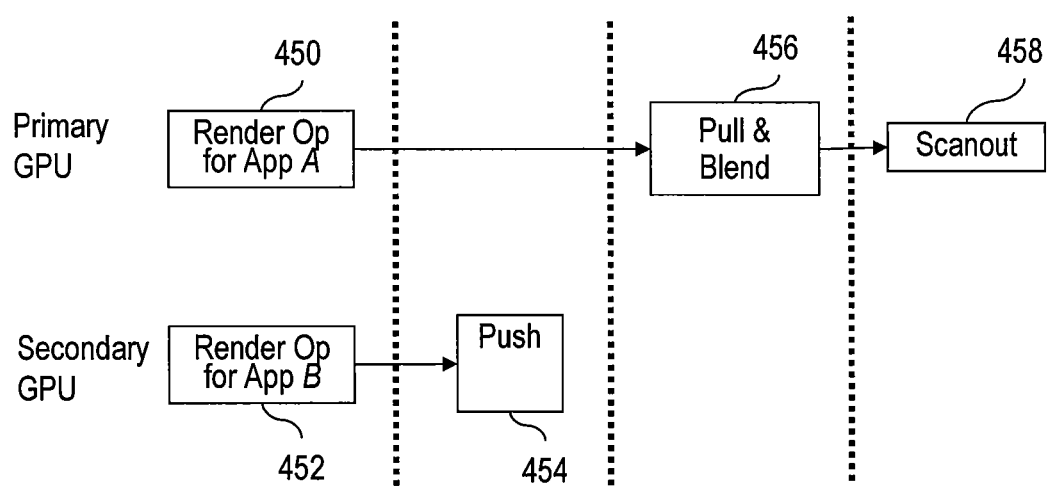
FIG. 4B illustrates a simplified process of blending rendered images from different applications without a specialized hardware unit, according to one embodiment of the present invention.

According to an alternative embodiment of the present invention, a computing device 400 as shown in FIG. 4A with multiple GPUs but without a video bridge and the hardware blending logic can still be configured to perform the aforementioned blending operation. Specifically, FIG. 4B illustrates a simplified process of blending rendered images from different applications without a specialized hardware unit, according to one embodiment of the present invention. Using the computing device 400 to illustrate such a process, the primary GPU 426 and the secondary GPU 432 perform the rendering operations associated with two different applications independently in steps 450 and 452, respectively. In one implementation, the computing device 400 allocates a block of memory from system memory 402 for use as a temporary buffer 406. When a secondary GPU 432 renders a frame associated with the application B, the application B requests to flip this rendered frame by transmitting it to the temporary buffer 406 in step 454. After the primary GPU 426 renders the frame associated with the application A, it then pulls the rendered image from the temporary buffer 406, applies the appropriate blending weights to the two rendered images, and blends the two weighted images in step 456. Here, the primary GPU 426 treats the rendered frame from the secondary GPU 432 as texture. In one implementation, the primary GPU 426 stores the blended results in a primary frame buffer in video memory 428 to be scanned out to a display device 438. It should be noted that the resources of the chipset 412 and also the primary GPU 426 in this implementation are utilized to carry out the blending operation.

In yet another alternative implementation, instead of pushing the rendered image to the system memory 402, the secondary GPU 432 can push the rendered image to the primary frame buffer in the video memory 428 through connections 422, 424, and chipset 412 or through connection 420 directly in step 454. Similar to the computing device 300 described above, the connections 422 and 424 support symmetric communication links, such as, without limitation, PCI-Express®, and the connection 420 can be any technically feasible scalable bus that provides a direct connection between the primary GPU 426 and the secondary GPU 432.

It is worth noting that in one implementation, the primary GPU 426 and the secondary GPU 432 are synchronized before proceeding to step 456. It should be apparent to a person with ordinary skills in the art to apply any synchronization scheme (e.g., semaphores) without exceeding the scope of the present invention. Furthermore, although the graphics subsystems 314 and 414 of systems 300 and 400, respectively, are shown to provide certain graphics processing capabilities, alternative embodiments of these graphics subsystems may process additional types of data, such as audio data, multimedia data, or the like.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for blending rendered images, comprising:
generating, via a first graphics processing unit (GPU), a first rendered image associated with a first application;
independently generating, via a second GPU, a second rendered image associated with a second application;
applying, via a blending logic included in a video bridge coupled to the first GPU and the second GPU, a first set of blending weights to the first rendered image to establish a first weighted image, wherein the first set of blending weights is stored in a plurality of registers included in the video bridge;
applying, via the blending logic, a second set of blending weights to the second rendered image to establish a second weighted image, wherein the second set of blending weights is stored in the plurality of registers included in the video bridge; and
blending, via the blending logic, the first weighted image and the second weighted image before scanning out a blended result to a first display device.

2. The method of claim 1, further comprising informing an operating system the availability of two graphics processing units (GPUs) and the attachment of two display devices to the two GPUs, even though only one of the two GPUs is attached to the first display device.

3. The method of claim 1, further comprising ensuring a first screen resolution associated with the first rendered image equals to a second screen resolution associated with the second rendered image.

4. The method of claim 1, wherein the blending step further comprises modifying the blended result with a configurable divider.

5. The method of claim 1, further comprising:
pushing the second weighted image to a temporary buffer; and
pulling the second weighted image from the temporary buffer and blending the second weighted image over the first weighted image.

6. The method of claim 5, further comprising:
synchronizing the pushing step and the pulling and blending step through uses of semaphores.

7. A graphics system configured to blend rendered images, comprising:

a first graphics processing unit (GPU) coupled to a first video memory, wherein the first GPU is configured to render images to be displayed on a first display device and generates a first rendered image associated with a first application; and a second GPU coupled to a second video memory, wherein the second GPU is configured to render images to be displayed on the first display device and generates a second rendered image associated with a second application; and a video bridge coupled to the first GPU and the second GPU, wherein the video bridge includes a plurality of registers that store a first set of blending weights and a second set of blending weights, and is configured to:

apply the first set of blending weights to the first rendered image to establish a first weighted image;

apply a second set of blending weights to the second rendered image to establish a second weighted image; and blend the first weighted image and the second weighted image to produce a blended result that is scanned out to the first display device.

8. The graphics subsystem of claim 7, wherein a device driver associated with the graphics subsystem informs an operating system the availability of two graphics processing units (GPUs) and the attachment of two display devices to the two GPUs, even though only one of the two GPUs is attached to the first display device.

9. The graphics subsystem of claim 7, wherein a device driver associated with the graphics subsystem ensures a first screen resolution associated with the first rendered image equals to a second screen resolution associated with the second rendered image.

10. The graphics subsystem of claim 7, wherein the blended result is further modified with a configurable divider.

11. The graphics subsystem of claim 7, wherein
the second GPU pushes the second weighted image to a temporary buffer; and
the first GPU pulls the second weighted image from the temporary buffer and blends the second weighted image over the first weighted image.

12. The graphics subsystem of claim 11, wherein the first GPU and the second GPU are synchronized to perform the pulling and blending operation and the pushing operation, respectively, through uses of semaphores.

13. The graphics subsystem of claim 11, wherein the temporary buffer resides in the first video memory.

14. The graphics subsystem of claim 11, wherein the temporary buffer resides in a shared system memory coupled to the graphics subsystem.

15. A computing device configured to blend rendered images comprising:

a chipset;

a host processor, coupled to the chipset;

a system memory, including a device driver, coupled to the chipset; and a graphics subsystem coupled to the chipset and including:

a first graphics processing unit (GPU) coupled to a first video memory, wherein the first GPU is configured to render images to be displayed on a first display device and generates a first rendered image associated with a first application being executed by the host processor; and a second GPU coupled to a second video memory, wherein the second GPU is configured to render images to be displayed on the first display device and generates a second rendered image associated with a second application being executed by the host processor; and a video bridge coupled to the first GPU and the second GPU, wherein the video bridge includes a plurality of registers that store a first set of blending weights and a second set of blending weights, and is configured to:

apply the first set of blending weights to the first rendered image to establish a first weighted image;

apply a second set of blending weights to the second rendered image to establish a second weighted image; and blend the first weighted image and the second weighted image to produce a blended result that is scanned out to the first display device.

16. The computing device of claim 15, wherein the device driver informs an operating system executing on the computing device the availability of two graphics processing units (GPUs) and the attachment of two display devices to the two GPUs, even though only one of the two GPUs is attached to the first display device.

17. The computing device of claim 15, wherein the device driver ensures a first screen resolution associated with the first rendered image equals to a second screen resolution associated with the second rendered image.

18. The computing device of claim 15, wherein
the second GPU pushes the second weighted image to a temporary buffer; and
the first GPU pulls the second weighted image from the temporary buffer and blends the second weighted image over the first weighted image.

* * * * *

UNITED STATES PATENT AND TRADEMARK OFFICE
CERTIFICATE OF CORRECTION

| | | |
|---|---|---|
| PATENT NO. | : 8,149,247 B1 | |
| APPLICATION NO. | : 11/936037 | |
| DATED | : April 3, 2012 | |
| INVENTOR(S) | : Franck R. Diard | |

It is certified that error appears in the above-identified patent and that said Letters Patent is hereby corrected as shown below:

Column 7 Claim 7, line 5 please delete "and".

Signed and Sealed this
Thirtieth Day of October, 2012

David J. Kappos
*Director of the United States Patent and Trademark Office*